(12) United States Patent
Luttmer

(10) Patent No.: US 11,170,275 B2
(45) Date of Patent: Nov. 9, 2021

(54) METHOD FOR CALIBRATING AND CONVERTING CMYK COLORS

(71) Applicant: Canon Production Printing Holding B.V., Venlo (NL)

(72) Inventor: Maurice L. M. Luttmer, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 16/881,218

(22) Filed: May 22, 2020

(65) Prior Publication Data

US 2020/0372311 A1    Nov. 26, 2020

(30) Foreign Application Priority Data

May 24, 2019   (EP) ..................................... 19176488

(51) Int. Cl.
    *G06K 15/02* (2006.01)
(52) U.S. Cl.
    CPC ................ *G06K 15/1878* (2013.01)
(58) Field of Classification Search
    CPC .................................................. G06K 15/1878
    USPC ........................................ 358/504, 1.9, 1.15
    See application file for complete search history.

(56) References Cited

U.S. PATENT DOCUMENTS

| | | | |
|---|---|---|---|
| 7,995,237 B2 | 8/2011 | Haikin et al. | |
| 2002/0159081 A1 | 10/2002 | Zeng | |
| 2006/0158669 A1 | 7/2006 | Haikin et al. | |
| 2013/0100465 A1 | 4/2013 | Fischer et al. | |
| 2014/0368844 A1* | 12/2014 | Luttmer | H04N 1/603 358/1.9 |

FOREIGN PATENT DOCUMENTS

EP    2816796 A1    12/2014

OTHER PUBLICATIONS

Search Report issued in European priority application 19176488.5, dated Oct. 29, 2019.

* cited by examiner

*Primary Examiner* — Quang N Vo
(74) *Attorney, Agent, or Firm* — Birch, Stewart, Kolasch & Birch, LLP

(57) ABSTRACT

A method for calibrating and converting colors of a digital image into printer specific colorant control values is disclosed. This method comprises the steps of calibrating a specific printer of a printer type according to a printer type specific procedure, wherein for each colorant separately a one-dimensional relationship between a printer tone value and a colorant control value is established; profiling the printer type to establish an output profile that defines a relationship between color values in a profile connecting color space and the printer tone values; deriving from the input profile and the output profile a one-dimensional relationship between a black channel and the black printer tone value of the printer; determining if an image color value is to be converted either by using the profiles or by using the one-dimensional relation; converting the image color value and subsequently using the printer calibration relations to obtain the colorant control values. This procedure enables the use of G7 colors in a printer that is limited in its amount of colorant that can be applied locally.

4 Claims, 2 Drawing Sheets

METHOD FOR CALIBRATING AND CONVERTING CMYK COLORS

BACKGROUND OF THE INVENTION

1. Field of the Invention

The invention relates to a method for converting CMYK colors of a digital image into printer specific colorant control values, comprising steps of calibrating a specific printer and profiling a printer type.

2. Description of the Related Art

Digital printing offers a number of advantages over more traditional forms of printing, but also comes with a number of challenges. One of them is the creation of a reliable color conversion method to convert colors in a digital image into a proper colorant control value that controls a printer to apply an appropriate amount of colorant. A reference frame for this conversion is defined by the International Color Consortium (ICC, www.color.org), which is already a couple of decades old. Still there is still ample confusion around, which prompts the need to involve color experts. It has also led to a certification practice for indicating whether a print provider keeps to an agreed standard.

In the ICC framework a color profile for each color processing device, such as input devices and output devices, is made and a Profile Connecting Space (PCS) is used to relate different devices. A printer is profiled as an output device by printing a number of single colorant and compound colorant test patches and measuring the colors of these test patches, using physical units, such as CIE XYZ and CIE Lab. In practice, a profile is often made for a printer type in dependence of an output media or media family, such that the profiling procedure does not have to be executed for each individual printer of this printer type. In that case it is only necessary for each individual printer to be properly calibrated in order to redress fabrication tolerances and obtain a defined printer output. Many calibration procedures will do the job, as long as a reproducible relation is obtained between a colorant control value that is used in a printer to control the application of a colorant, and a printer tone value that represents an optical effect of the applied amount of colorant. Such a relation is one-dimensional and is also known as a transfer curve. It is commonly implemented as a look-up table (LUT). In contrast, a profile is a relation between the three dimensions of a physical color characterization, such as CIE Lab, and the printer tone values.

A standard calibration procedure has been devised for CMYK-printers. This calibration is known as G7 and is described in specification ANSI CGATS/IDEAlliance TR015-2015. This calibration aims at making all CMYK-printers respond similarly by adjusting the transfer curves for the individual colorants in such a way that a simultaneous application of predefined, almost equal amounts of cyan, magenta, and yellow in compound colors result in a neutral gray color. A black transfer curve is also specified and a certification of a print provider complying with the G7 standard exists, involving a G7 verification.

A disadvantage of the G7 calibration is that it is a rather laborious procedure. A further, even larger disadvantage is that for some print processes, such as ink jet print processes, it may be impossible to apply simultaneously the required amounts of colorant during calibration, as the receiving media may be unable to digest the large colorant amounts. Since the neutral gray colors require both cyan, magenta, and yellow colorant, the sum of these colorant amounts may be 300%, thus easily passing the total area coverage (TAC), which is a limit for the total amount of colorant that may be applied. In that case it is not possible to perform the G7 calibration procedure. In order to make such a printer still respond as G7 calibrated and pass the G7 verification test, a single colorant calibration procedure is applied together with a profiling procedure, establishing individual colorant transfer curves and an output profile. Combining this output profile with a G7 compatible input profile, a system response is obtained that satisfies the requirements of the above-mentioned specification. Such a single colorant calibration is e.g. a so-called Distance-to-White (DTW) calibration, wherein a printer tone value for a single colorant varies linearly with the color distance in CIE Lab coordinates between a produced color and the no-coverage color, which is the color of a medium without colorant, most often a white color. This method of calibrating and profiling is a convenient way to make a printer on the one hand respond as a G7 calibrated printer and on the other hand apply single colorant calibration.

After finishing the calibration and the profiling procedure, digital image colors are converted first by an input profile, that converts image colors into PCS colors, then by an output profile, that converts PCS colors into printer tone values, and subsequently by the calibration transfer curves, that converts the printer tone values into specific colorant control values. For digital image colors in CMYK, it is convenient to solve an ambiguity in the rendering of neutral colors as described in U.S. Pat. No. 7,995,237. Herein a black preservation method is described that has the ability to preserve black-only content, i.e. the data within an image composed solely of black, including purely neutral gray levels between white and black. This method prevents the occurrence of combinations of C, M, and Y components to represent black-only content, which could lead to loss of fine detail, color edges due to small misregistration or color cast in neutral areas.

Combining this black preservation with the indicated calibration and profiling method leads to a problem in the gradation of black colorant, since the black-only input signals are not processed by the profile combination. It is an object of the present invention to provide a method to overcome this problem, thus preparing a printer to pass the G7 verification test.

SUMMARY OF THE INVENTION

In order to achieve this object, the method according to the invention comprises the steps of:
a) calibrating a specific printer of a printer type according to a printer type specific procedure, wherein for each colorant separately a one-dimensional relationship between a printer tone value and a colorant control value is established;
b) profiling a printer type to establish a profile combination that defines a relationship between color values in an image color space and the printer tone values;
c) deriving from the profile combination a one-dimensional relationship between a single color component in the image color value and a corresponding component in the printer tone value;
d) determining if an image color value is to be converted either with the profile combination or with the one-dimensional relation;
e) converting the image color value as determined in step d) and subsequently with the calibration relations established in step a) to obtain the colorant control values.

Steps a) and b) are well-known in the field of color matching. In fact, these are the conventional steps for all ICC based workflows. A printer type defines a number of printers that use a similar print engine, the same colorants and the same media to print on. Each specific print engine needs to be calibrated to compensate for individual, manufacturing differences. It is noted that a calibration procedure for individual colorants is not likely to exceed beyond a TAC limit, in contrast to procedures that determine the one-dimensional transfer curves in mutual dependency. After the calibration of an individual printer, a single profiling procedure for any printer of this type may be used for one or several media that are suitable for the printer type, the media collected in what is sometimes called a media family. Thus, the behaviour of colorant compounds in relation to the receiving substrate is contained in an output profile. Combining this output profile with an input profile that defines the colors in an input image prepares the output device for rendering the colors of the image as intended.

From the input and output profiles that are comprised in the profile combination, a one-dimensional relationship, i.e. a single transfer curve, is derived for a color that may be generated either by a single colorant or by a compound of other colorants. In CMYK printers this is mostly a grey color that may be generated by black colorant only on a white medium or by compounds of cyan, magenta and yellow colorant. In printers with more colorants, such as red colorant, a red color may be made by this colorant only or by compounds of magenta and yellow. Such an additional transfer curve is used to bypass the color management profiles. It has been found by the inventor that this additional transfer curve is to be established based on values already present in the profiles. This provides the advantage that a better continuity between colors processed by the profiles and colors processed by the bypass. All colorant components pass subsequently the individual calibration curves. This way, the printer behaves more consistently.

In an embodiment, the method as outlined is implemented for a CMYK printer, wherein a profile-bypass is used for the black color channel. Text and lines in an input image defined in black can thus be rendered with black colorant only by using the bypass, whereas gray and black colors in an photographic part of the input image may be rendered by compound colors after passing the color profiles.

In an embodiment, a distinction between the different gray image elements is made by checking if the color components of an input color, except for the black component, are below a threshold value. When the input color comprises predominantly or only black, the bypass conversion ensures that the output color still comprises mainly black, whereas the profile conversion might result in a more compound color with cyan, magenta, and yellow, which is to be avoided.

In a further embodiment, the bypass additional transfer curve is derived by the steps of:
c1) determining a lightness corresponding to an input black channel value;
c2) determining an equivalent G7 channel value for this lightness in dependence on the no-coverage lightness and the 100%-coverage lightness on the input side;
c3) determining an output lightness for the G7 channel value in dependence on the no-coverage lightness and the 100%-coverage lightness on the output side; and
c4) determining a black printer tone value from the output lightness.

As indicated earlier, the G7 specification prescribes a black tone scale aim (paragraph 5.5) in dependence on the luminous reflectance factor of the dark end of the black scale and the luminous reflectance factor of the substrate. These are readily derived from the lightness that is associated with 100% black and the 0% coverage in the input and output profile. The step sequence above makes the bypass obey this specification.

Further details of the invention are given in the dependent claims. The present invention may also be embodied in a printer controller pertaining to a printer and in a non-transitory computer readable medium storing computer executable instructions.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF EMBODIMENTS

Figure 1:
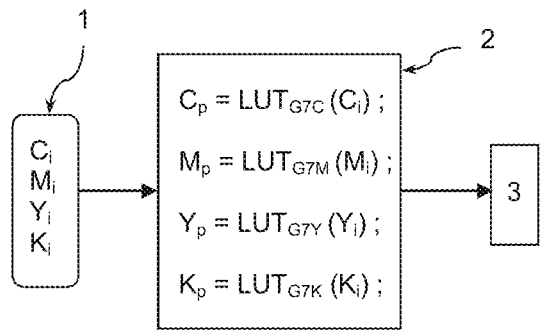
FIG. 1 is a conversion scheme of a printer only applying a calibration according to a G7 specification.

The present invention will now be described with reference to the accompanying drawings, wherein the same or similar elements are identified with the same reference numeral.

In FIG. 1 an existing conversion scheme is shown. This conversion, following a G7 specification (ANSI CGATS/IDEAlliance TR015-2015) comprises four single colorant transfer curves 2, indicated by $LUT_{G7}$, wherein a CMYK color as given in an input image 1 is component by component converted into printer control values. These input colors have four components, $C_i$, $M_i$, $Y_i$, and $K_i$, which is considered to be a set $S_i$. The color signal that is sent to the printer 3 are the colorant control values $C_p$, $M_p$, $Y_p$, and $K_p$, or in short $S_p$. Since $S_p$ is different for each individual printer 3, a full, complex calibration is needed to determine the mutual dependent transfer curves. In particular, it is not possible to follow this calibration procedure if a TAC limit is set on the print process of the printer 3.

Figure 2:
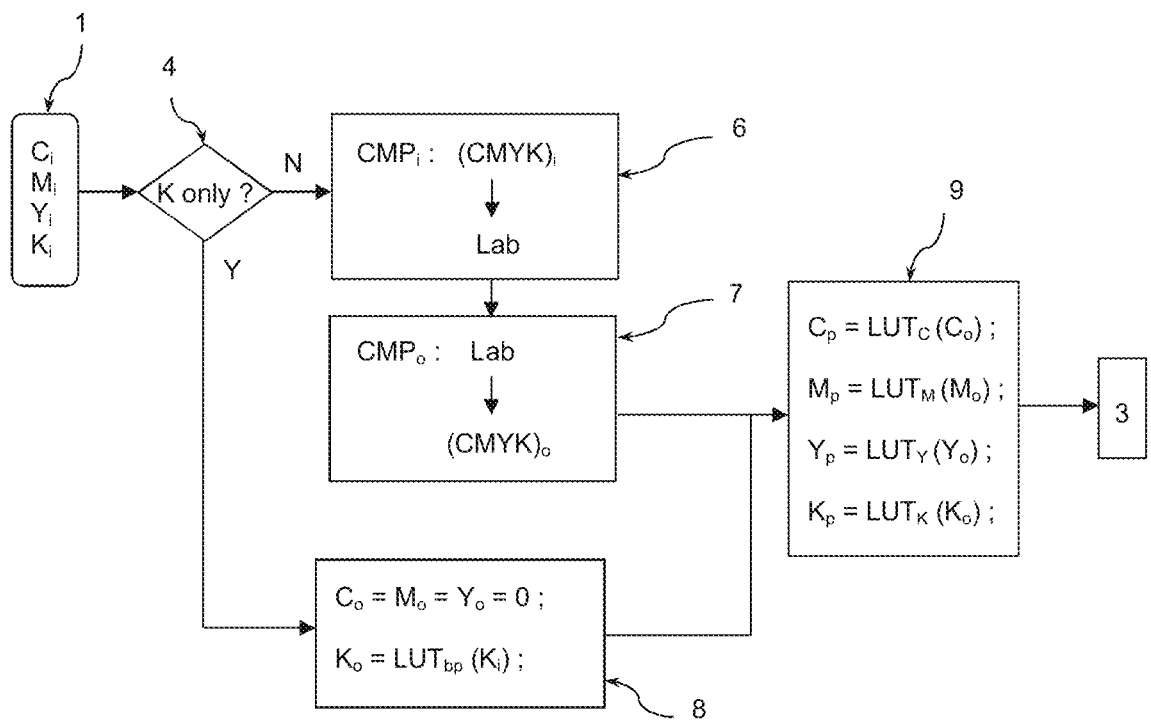
FIG. 2 is a conversion scheme according to the present invention.

In FIG. 2 a color conversion scheme according to the present invention is shown. A color of the input image 1 with color components $C_i$, $M_i$, $Y_i$, and $K_i$, is examined for its optimal conversion path in decision box 4. If the color is to be rendered with black colorant only (4, path Y), in this case by checking if $C_i=M_i=Y_i=0$, the output values $C_o$, $M_o$, $Y_o$, are set to zero in bypass box 8 and only a $K_o$ output value is passed to the printer calibration box 9. Otherwise (4, N) the input image color is passed to an appropriate input Color Matching Profile ($CMP_i$) 6 and output Color Matching Profile ($CMP_o$) 7, wherein the CMYK value is interpreted as a physical color in a Profile Matching Color Space (PMS), in this case L, a, b, and converted to an output color value for the CMYK printer 3. The output color value is appropriate for any printer 3 of the same type, as long as the printer is calibrated according to a fixed procedure. The selected profile may be one of a set of profiles, taking into consideration a rendering intent and a media family to which the receiving substrate in the printer belongs. The calibration box 9 comprises four transfer curves ($LUT_C$ etc.), which are one-dimensional relations between an input and output value, that are established by a calibration procedure that takes one colorant at a time into consideration. This differs from the procedure as needed for the conversion scheme of FIG. 1, in that a low TAC can be observed. No compound colors are necessary in this calibration. The relation between $K_i$ and $K_o$ in bypass box 8 is established along a line of steps, graphically shown in FIG. 3.

Figure 3:
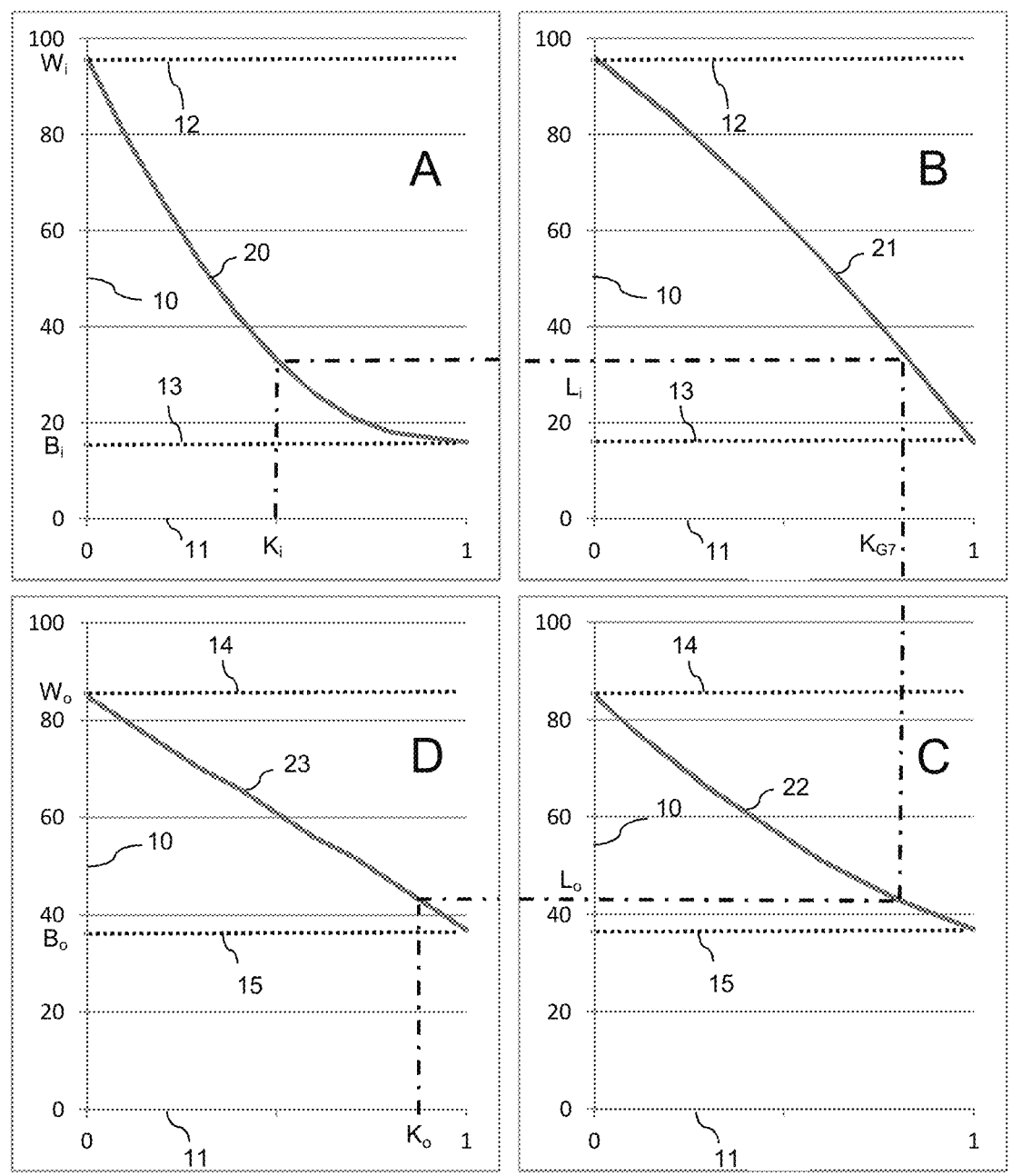
FIG. 3 is a graphical outline of the way to find the bypass relation.

FIG. 3 comprises four graphs, labelled A to D. Graph A indicates a relation 20 between an input value $K_i$ on a horizontal axis 11, running from 0 to 1, and a corresponding lightness $L_i$ on a vertical axis 10, running from 0 to 100. This relation is obtained from the input profile $CMP_i$ and defines a lightness value $W_i$ associated with an input medium without colorant and a lightness $B_i$ associated with 100%, or a maximum amount of black. Graph B indicates a relation 21 between a black tone value on the horizontal axis and a lightness on the vertical axis according to the G7 specification, given the values $W_i$ and $B_i$ as found from the profile $CMP_i$, following the dotted lines 12 and 13 The tone value $K_{G7}$ is found for the particular value $L_i$. Graph C shows the relation 22 between the tone value and the lightness according to the G7 specification using the values $W_o$ and $B_o$ that are obtained from the output profile $CMP_o$ for 0% and 100% black tone value on the output side. For the specific value $K_{G7}$ an output lightness $L_o$ is found, which is used in graph D, showing the output relation 23 between the black tone value and the lightness as represented in the output profile $CMP_o$, to obtain an output tone value $K_o$. Thus, a relation between an input value $K_i$ and an output value $K_o$ can be obtained that is used in the bypass box 8 as $LUT_{bp}$. It is understood that the shown relations are exaggerated to demonstrate the workings of the individual steps. If a G7 verification test is conducted and a G7 compatible input profile is used, the printer 3 will respond as if calibrated according to the G7 specification.

Thus, a color conversion path is defined that prevents the printer from color recipes that exceed a TAC limit on the one hand and obeys a predefined behaviour, such as G7 behaviour, on the other hand. It is noted that a number of conversions as indicated in this scheme separately may be combined to provide a faster processing. This does not change the content of the described processing steps.

The skilled person will recognise that other embodiments are possible within the scope of the appended claims.

The invention claimed is:

1. A method for calibrating and converting colors of a digital image into printer specific colorant control values, the method comprising the steps of:
    a) calibrating a specific printer of a printer type according to a printer type specific procedure, wherein for each colorant separately a one-dimensional relationship between a printer tone value and a colorant control value is established;
    b) profiling the printer type to establish a profile combination that defines a relationship between color values in an image color space and the printer tone values;
    c) deriving from the profile combination a one-dimensional relationship between a single color component in the image color value and a corresponding component in the printer tone value;
    d) determining if an image color value is to be converted either with the profile combination or with the one-dimensional relation, and
    e) converting the image color value as determined in step d) and subsequently with the calibration relations established in step a) to obtain the colorant control values,
   wherein the single color component is a black component, and
   wherein the one-dimensional relationship is derived by the steps of:
      c1) determining a lightness corresponding to an input black channel value;
      c2) determining an equivalent G7 channel value for this lightness in dependence on the no-coverage lightness and the 100%-coverage lightness on the input side;
      c3) determining an output lightness for the G7 channel value in dependence on the no-coverage lightness and the 100%-coverage lightness on the output side; and
      c4) determining a black printer tone value from the output lightness.

2. The method according to claim 1, wherein the step of determining how an image color value is to be converted (step d) comprises a step of determining if all but the black component in the image color value are lower than a predefined threshold.

3. A non-transitory computer readable medium storing computer executable instructions for executing a method according to claim 1.

4. A printer comprising a printer controller and a print engine, the printer controller including a CPU that is programmed to:
    a) calibrate the print engine according to a printer type specific procedure, wherein for each colorant separately a one-dimensional relationship between a printer tone value and a colorant control value is established;
    b) profile the print engine to establish a profile combination that defines a relationship between color values in an image color space and the printer tone values;
    c) derive from the profile combination a one-dimensional relationship between a single color component in the image color value and a corresponding component in the printer tone value;
    d) determine if an image color value is to be converted either with the profile combination or with the one-dimensional relation, and
    e) convert the image color value as determined in step d) and subsequently with the calibration relations established in step a) to obtain the colorant control values,
   wherein the single color component is a black component, and
   wherein CPU is further programmed to
      determine a lightness corresponding to an input black channel value;
      determine an equivalent G7 channel value for this lightness in dependence on the no-coverage lightness and the 100%-coverage lightness on the input side;
      determine an output lightness for the G7 channel value in dependence on the no-coverage lightness and the 100%-coverage lightness on the output side; and
      determine a black printer tone value from the output lightness, in order to derive said one-dimensional relationship.

* * * * *